United States Patent [19]

Rachels, Sr.

[11] Patent Number: 5,488,515

[45] Date of Patent: Jan. 30, 1996

[54] HOOD MOUNTED SAFETY MIRROR FOR VEHICLES

[76] Inventor: David D. Rachels, Sr., 2318 Floral Dr., Niles, Mich. 49120

[21] Appl. No.: 355,535

[22] Filed: Dec. 14, 1994

[51] Int. Cl.⁶ .............................. G02B 5/08; G02B 7/182; B60R 1/06
[52] U.S. Cl. .................... 359/855; 359/856; 359/857; 359/871
[58] Field of Search ..................................... 359/838, 850, 359/855, 856, 857, 861, 862, 864, 865, 866, 871, 872

[56] References Cited

U.S. PATENT DOCUMENTS

| | | | |
|---|---|---|---|
| 1,533,937 | 4/1925 | Mogor | 359/855 |
| 1,562,335 | 11/1925 | Jones | 359/855 |
| 1,946,230 | 2/1934 | Mosberg | 359/850 |
| 2,210,807 | 8/1940 | Fitzgerald | 359/855 |
| 3,187,628 | 6/1965 | Canns et al. | 359/866 |
| 3,252,377 | 5/1966 | Kentes | 359/855 |

FOREIGN PATENT DOCUMENTS

| | | | |
|---|---|---|---|
| 0500174 | 3/1952 | Belgium | 359/866 |
| 2524851 | 10/1983 | France | 359/855 |
| 1810335 | 6/1970 | Germany | 359/855 |
| 2116332 | 5/1987 | Japan | 359/850 |
| 1070598 | 6/1967 | United Kingdom | 359/855 |
| 2177361 | 1/1987 | United Kingdom | 359/850 |

*Primary Examiner*—Ricky D. Shafer

[57] ABSTRACT

A new and improved hood mounted safety mirror for vehicles comprised of an elongated stem portion having a top surface, a bottom surface, a front portion, a back portion, and two side portions. The two side portions has an elongated mirror secured thereto. The elongated stem portion is secured to a center portion of a hood of a car. An arrow portion is integral with the front portion of the stem portion. The arrow portion has an inner surface, an outer surface, a top surface, a bottom surface, and two outwardly extending side portions. The inner surface of the two outwardly extending portions has a mirror secured thereto. Each of the two outwardly extending side portions is angled at a position as such to allow a driver to view obstructions off to a side of the car as reflected from the mirrors on the side portions of the stem portion to the mirrors within the recess of the outwardly extending side portions to eyes of the driver.

4 Claims, 4 Drawing Sheets

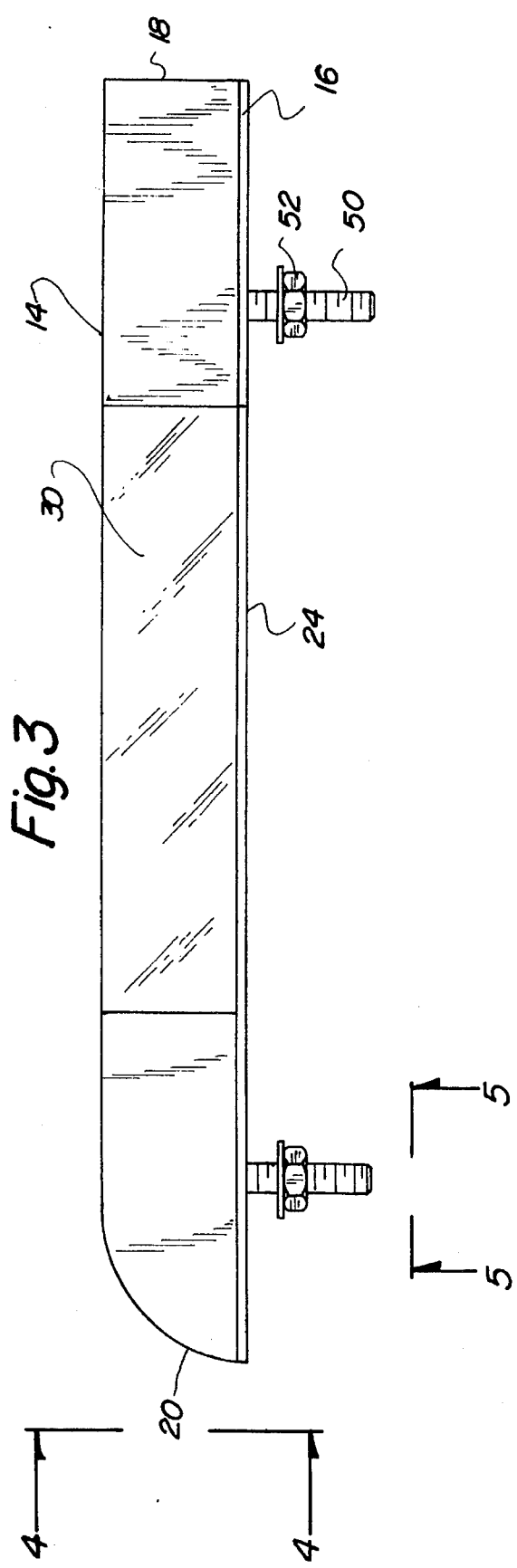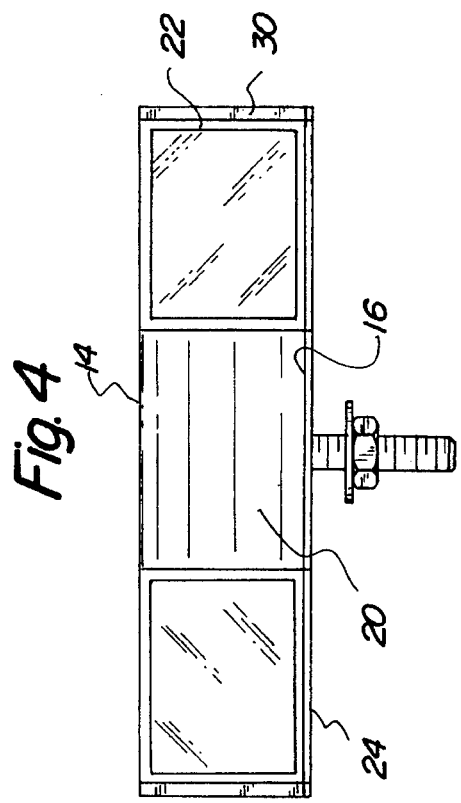

HOOD MOUNTED SAFETY MIRROR FOR VEHICLES

BACKGROUND OF THE INVENTION

1. Field of the Invention

The present invention relates to a hood mounted safety mirror for vehicles and more particularly pertains to allowing a driver to see what road conditions are on both sides of the road with a hood mounted safety mirror for vehicles.

2. Description of the Prior Art

The use of vehicle safety devices is known in the prior art. More specifically, vehicle safety devices heretofore devised and utilized for the purpose of providing blind side viewing are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 307,412 to Kaiser et al. discloses the ornamental design for a vehicle hood ornament.

U.S. Pat. No. 4,913,941 to Tedrahn discloses a removable car hood ornament apparatus.

U.S. Pat. No. Des. 255,562 to Szperkowski discloses the ornamental design for an automotive hood ornament.

U.S. Pat. No. Des. 244,184 to Kubitskey discloses the ornamental design for an automotive hood ornament.

U.S. Pat. No. 3,741,633 to Haley discloses a vehicle blind side mirror system.

While these devices fulfill their respective, particular objective and requirements, the aforementioned patents do not describe a hood mounted safety mirror for vehicles for allowing a driver to see what road conditions are on both sides of the road.

In this respect, the hood mounted safety mirror for vehicles according to the present invention substantially departs from the conventional concepts and designs of the prior art, and in doing so provides an apparatus primarily developed for the purpose of allowing a driver to see what road conditions are on both sides of the road.

Therefore, it can be appreciated that there exists a continuing need for new and improved hood mounted safety mirror for vehicles which can be used for allowing a driver to see what road conditions are on both sides of the road. In this regard, the present invention substantially fulfills this need.

SUMMARY OF THE INVENTION

In the view of the foregoing disadvantages inherent in the known types of vehicle safety devices now present in the prior art, the present invention provides an improved hood mounted safety mirror for vehicles. As such, the general purpose of the present invention, which will be described subsequently in greater detail, is to provide a new and improved hood mounted safety mirror for vehicles and method which has all the advantages of the prior art and none of the disadvantages.

To attain this, the present invention essentially comprises an elongated stem portion having a top surface, a bottom surface, a front portion, a back portion, and two side portions. The bottom surface has a rubber pad theresecured. The rubber pad serves to prevent the stem portion from scratching a hood of a car. The bottom portion has a plurality of slotted apertures therethrough. The two side portions have an elongated mirror secured thereto. An arrow portion is integral with the front portion of the stem portion. The arrow portion has an inner surface, an outer surface, a top surface, a bottom surface, and two outwardly extending side portions. The bottom surface has a rubber pad theresecured. The bottom surface has a plurality of slotted apertures therethrough. The inner surface of the two outwardly extending portions have an elongated recess therein. Each elongated recess has a mirror secured therein. Each of the two outwardly extending side portions is angled at a position as such to allow a driver to view obstructions off to a side of the car as reflected from the mirrors on the side portions of the stem portion to the mirrors within the recess of the outwardly extending side portions to eyes of the driver. The device contains a plurality of securement means. Each of the securement means removably secure the stem portion and the arrow portion to a center portion of the hood of a car through the slotted apertures thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hood mounted safety mirror for vehicles which has all the advantages of the prior art vehicle safety devices and none of the disadvantages.

It is another object of the present invention to provide a new and improved hood mounted safety mirror for vehicles which may be easily and efficiently manufactured and marketed.

It is a further object of the present invention to provide a new and improved hood mounted safety mirror for vehicles which is of durable and reliable construction.

An even further object of the present invention is to provide a new and improved hood mounted safety mirror for vehicles which is susceptible of a low cost of manufacture with regard to both materials and labor, and which accordingly is then susceptible of low prices of sale to the consuming public, thereby making such a hood mounted safety mirror for vehicles economically available to the buying public.

Still yet another object of the present invention is to provide a new and improved hood mounted safety mirror for vehicles which provides in the apparatuses and methods of the prior art some of the advantages thereof, while simultaneously overcoming some of the disadvantages normally associated therewith.

Even still another object of the present invention is to provide a new and improved hood mounted safety mirror for vehicles for allowing a driver to see what road conditions are on both sides of the road.

Lastly, it is an object of the present invention to provide a new and improved hood mounted safety mirror for vehicles comprised of an elongated stem portion having a top surface, a bottom surface, a front portion, a back portion, and two side portions. The two side portions has an elongated mirror secured thereto. The elongated stem portion is secured to a center portion of a hood of a car. An arrow portion is integral with the front portion of the stem portion. The arrow portion has an inner surface, an outer surface, a top surface, a bottom surface, and two outwardly extending side portions. The inner surface of the two outwardly extending portions has a mirror secured thereto. Each of the two outwardly extending side portions is angled at a position as such to allow a driver to view obstructions off to a side of the car as reflected from the mirrors on the side portions of the stem portion to the mirrors within the recess of the outwardly extending side portions to eyes of the driver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevation view of the present invention.

FIG. 4 is a cross-sectional view as taken along line 4—4 of FIG. 3.

The same reference numerals refer to the same parts through the various Figures.

DESCRIPTION OF THE PREFERRED EMBODIMENT

Figure 1:
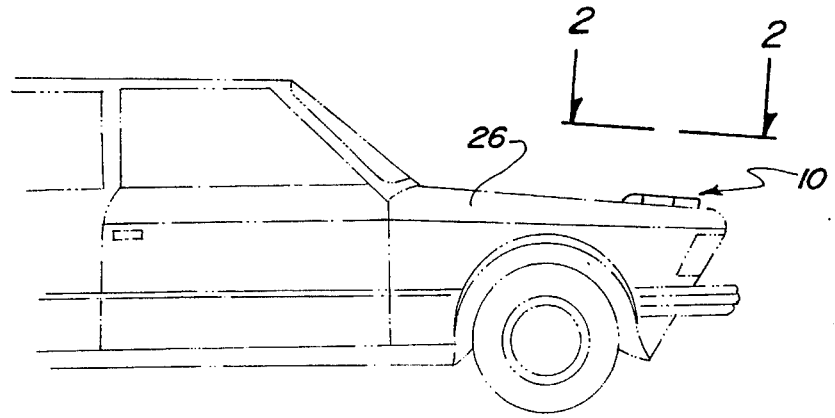
FIG. 1 is a perspective view of the preferred embodiment of the hood mounted safety mirror for vehicles constructed in accordance with the principles of the present invention.
Figure 2:
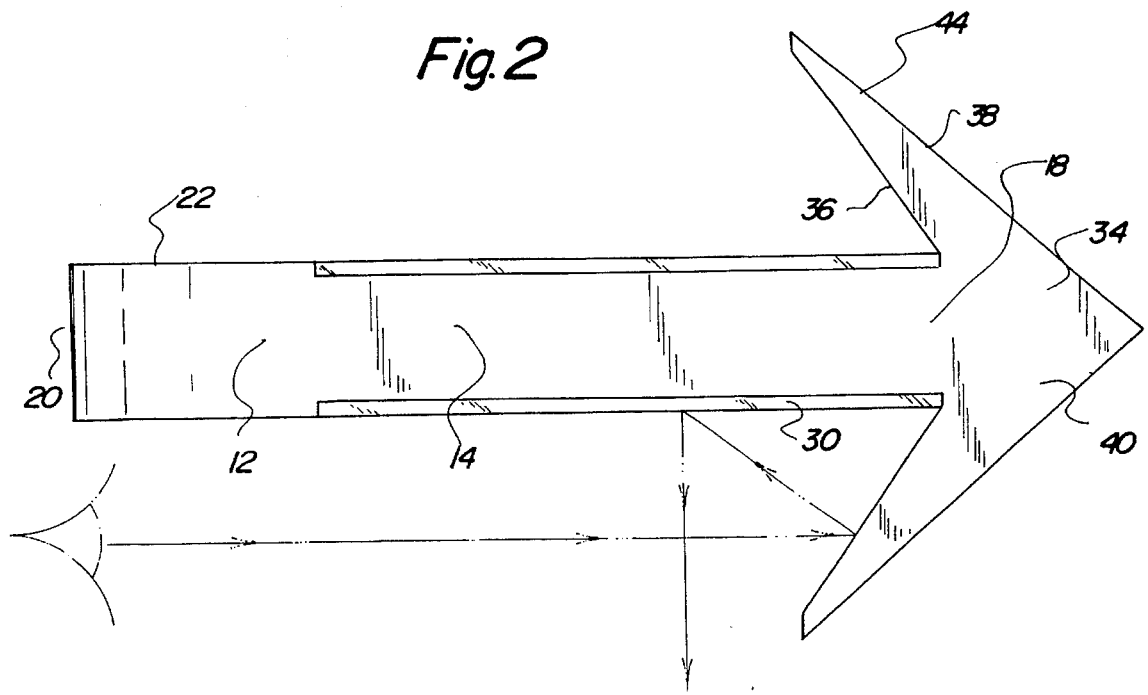
FIG. 2 is a plan view of the preferred embodiment of the present invention.
Figure 5:
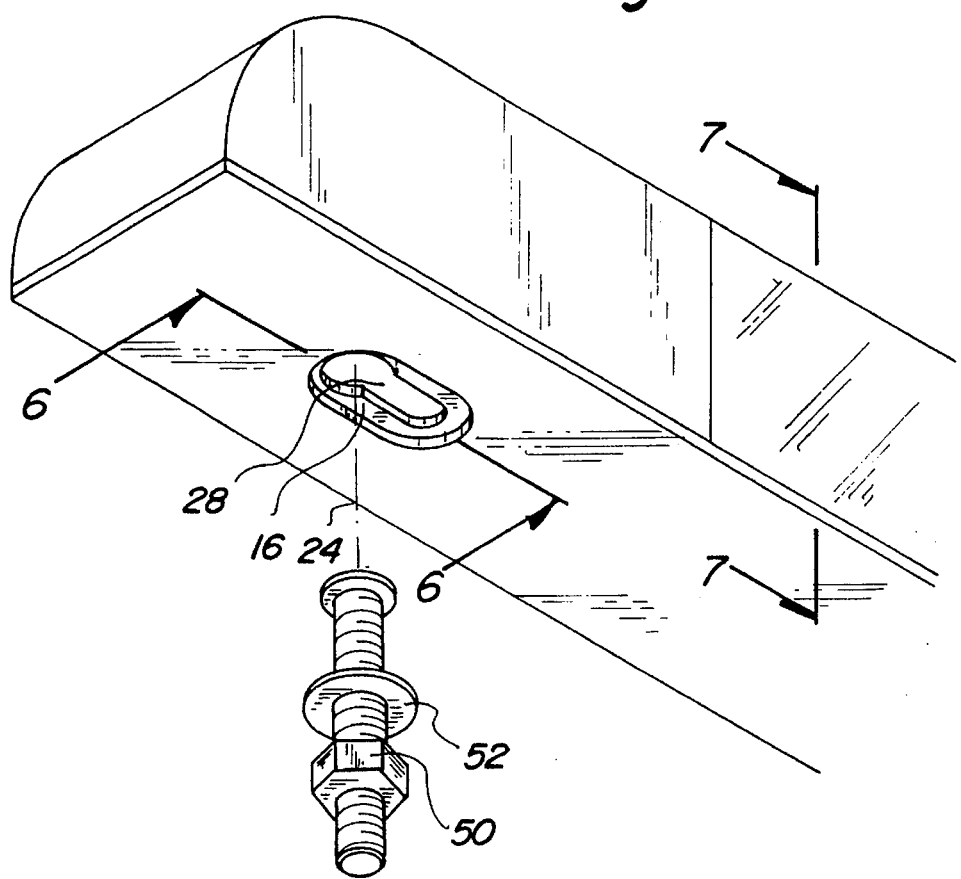
FIG. 5 is a cross-sectional view as taken along line 5—5 of FIG. 3.
Figure 6:
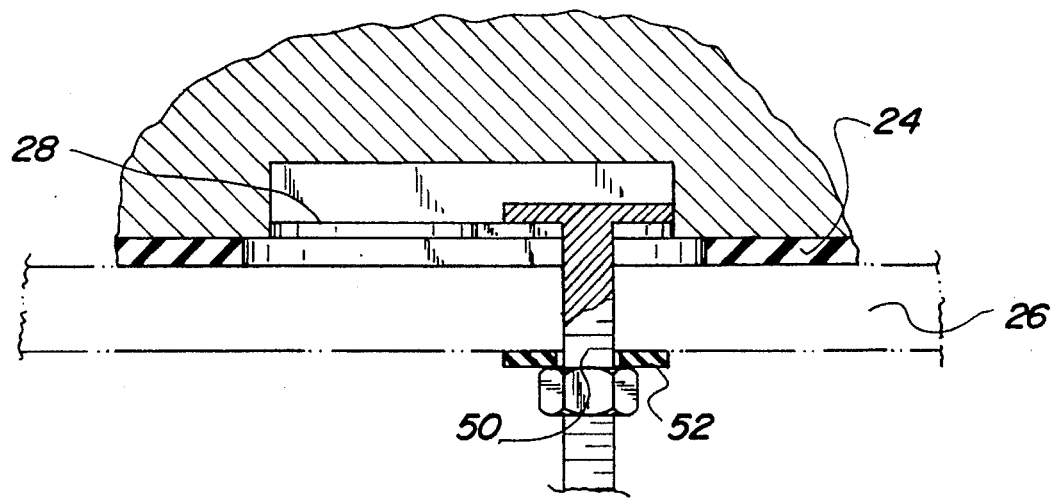
FIG. 6 is a cross-sectional view as taken along line 6—6 of FIG. 5.
Figure 7:
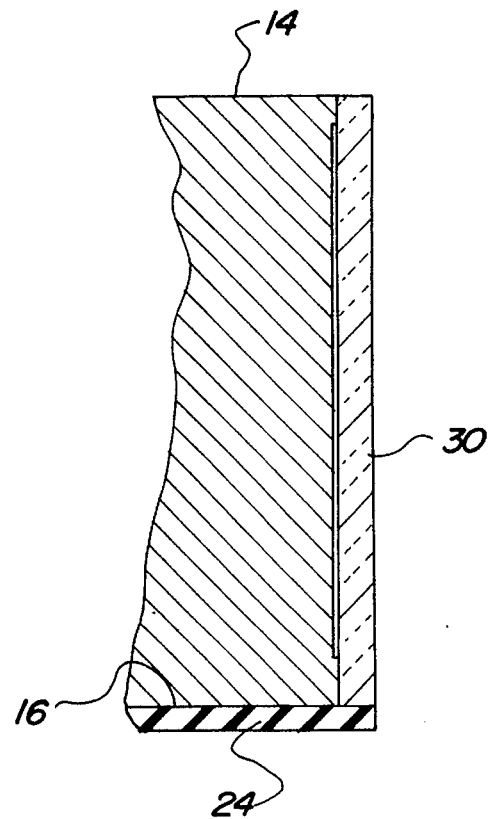
FIG. 7 is a cross-sectional view as taken along line 7–7 of FIG. 5.
Figure 8:
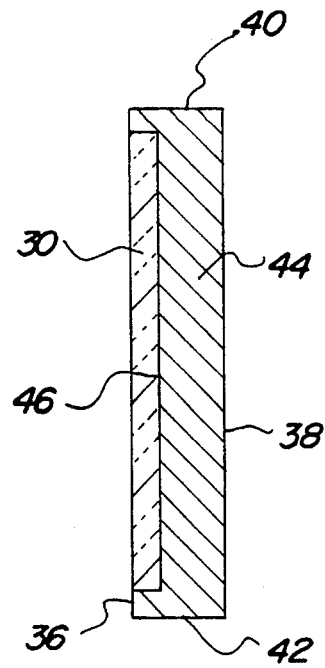
FIG. 8 is a cross-sectional view of the arrow portion of the present invention.

With reference now to the drawings, and in particular, to FIG. 1 thereof, the preferred embodiment of the new and improved hood mounted safety mirror for vehicles embodying the principles and concepts of the present invention and generally designated by the reference number 10 will be described.

Specifically, it will be noted in the various Figures that the device relates to a new and improved hood mounted safety mirror for vehicles for allowing a driver to see what road conditions are on both sides of the road. In its broadest context, the device consists of an elongated stem portion, an arrow portion, and a securement means.

The device 10 contains an elongated stem portion 12 having a top surface 14, a bottom surface 16, a front portion 18, a back portion 20, and two side portions 22. The bottom surface 16 has a rubber pad 24 theresecured. The rubber pad 24 serves to prevent the stem portion 12 from scratching a hood 26 of a car. The bottom surface 16 has a plurality of slotted apertures 28 therethrough. The two side portions 22 have an elongated mirror 30 secured thereto.

An arrow portion 34 is integral with the front portion 18 of the stem portion 12. The arrow portion 34 has an inner surface 36, an outer surface 38, a top surface 40, a bottom surface 42, and two outwardly extending side portions 44. The bottom surface 42 has a rubber pad 24 theresecured. The bottom surface 42 has a plurality of slotted apertures 28 therethrough. The inner surface 36 of the two outwardly extending portions 44 have an elongated recess 46 therein. Each elongated recess 46 has an elongated mirror 30 secured therein. Each of the two outwardly extending side portions 44 is angled at a position as such to allow a driver to view obstructions off to a side of the car as reflected from the mirrors 30 on the side portions 22 of the stem portion 12 to the mirrors 30 within the recess 46 of the outwardly extending side portions 44 to eyes of the driver. This allows the driver to edge the nose of the car out slightly allowing the mirrors 30 on the stem portion 12 to reflect any other cars or pedestrians that are approaching thus eliminating the possibility of an accident.

The device 10 contains a plurality of securement means 50. Each of the securement means 50 removably secure the stem portion 12 and the arrow portion 34 to a center portion of the hood of a car through the slotted apertures 28 thereof. The securement means 50 could include a rubber washer 52 that would prevent the inner surface of the hood to be scratched.

The present invention is a mirror which is mounted on the front of the hood of a vehicle. It is ornamental in appearance, but serves a very important purpose. That purpose is to allow the driver to see what the road conditions are on each side, before pulling out into the street or highway. Entering traffic from a driveway or intersection is made very dangerous whenever the view to either side is obstructed. There may be parked vehicles or piles of snow on the sides and along the road, which makes it impossible to look down one or both sides. Cautious drivers inch their way out slowly, warning approaching traffic and pedestrians of their intention of entering on the highway. With the present invention the driver will be able to see if there are any on-coming pedestrians or vehicles.

The present invention is shaped like an arrow. It is 8 inches long, and the stem portion of the arrow is 1.5 inches thick and stands 2 inches tall. The point of the arrow faces the front of the vehicle. The reflective portions of the ornament are on the backsides of the arrowhead and these are made of glass or highly polished chrome metal. They are angled so that the views perpendicular to the front of the car are visible to the driver. The width of the arrowhead is 5.5 inches. The present invention is made of plastic, copper or steel and is attached to the hood with appropriate fasteners.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A hood mounted safety mirror for vehicles for allowing a driver to see what road conditions are on both sides of the road comprising, in combination:

an elongated stem portion having a top surface, a bottom surface, a front portion, a back portion, and two side portions, the bottom surface having a rubber pad theresecured, the rubber pad serving to prevent the stem portion from scratching a hood of a car, the bottom surface having a plurality of slotted apertures therethrough, the two side portions each having an elongated mirror secured thereto;

an arrow portion integral with the front portion of the stem portion, the arrow portion having an inner surface, an outer surface, a top surface, a bottom surface, and two outwardly extending side portions, the bottom surface having a rubber pad theresecured, the bottom surface having a plurality of slotted apertures therethrough, the inner surface of the two outwardly extending portions having an elongated recess therein, each elongated recess having a mirror secured therein, each of the two outwardly extending side portions being angled at a position as such to allow a driver to view obstructions off to a side of the car as reflected from the mirrors on the side portions of the stem portion to the mirrors within the recess of the outwardly extending side portions to eyes of the driver;

a plurality of securement means, each of the securement means removably securing the stem portion and the arrow portion to a center portion of the hood of a car through the slotted apertures thereof.

2. A hood mounted safety mirror for vehicles for allowing a driver to see what road conditions are on both sides of the road comprising, in combination:

an elongated stem portion having a top surface, a bottom surface, a front portion, a back portion, and two side portions, the two side portions each having an elongated mirror secured thereto, the elongated stem portion secured to a center portion of a hood of a car;

an arrow portion integral with the front portion of the stem portion, the arrow portion having an inner surface, an outer surface, a top surface, a bottom surface, and two outwardly extending side portions, the inner surface of the two outwardly extending portions having a recess therein, each recess having a mirror secured thereto, each of the two outwardly extending side portions being angled at a position as such to allow a driver to view obstructions off to a side of the car as reflected from the mirrors on the side portions of the stem portion to the mirrors within the recess of the outwardly extending side portions to eyes of the driver.

3. The safety mirror as described in claim 2 wherein the bottom surface of the stem portion and the bottom surface of the arrow portion, each includes a rubber pad secured thereto, the rubber pad serving to prevent the stem and arrow portions from scratching a hood of a car.

4. The safety mirror as described in claim 3 wherein the recess of the inner surface of the two outwardly extending portions is elongated, each elongated recess securing the mirror therein.

\* \* \* \* \*